United States Patent
Altman et al.

(10) Patent No.: US 6,779,049 B2
(45) Date of Patent: Aug. 17, 2004

(54) SYMMETRIC MULTI-PROCESSING SYSTEM WITH ATTACHED PROCESSING UNITS BEING ABLE TO ACCESS A SHARED MEMORY WITHOUT BEING STRUCTURALLY CONFIGURED WITH AN ADDRESS TRANSLATION MECHANISM

(75) Inventors: Erik R. Altman, Danbury, CT (US); Peter G. Capek, Ossining, NY (US); Michael Gschwind, Chappaqua, NY (US); Harm Peter Hofstee, Austin, TX (US); James Allan Kahle, Austin, TX (US); Ravi Nair, Briarcliff Manor, NY (US); Sumedh Wasudeo Sathaye, Lagrangeville, NY (US); John-David Wellman, Hopewell Junction, NY (US); Masakazu Suzuoki, Austin, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 09/736,585

(22) Filed: Dec. 14, 2000

(65) Prior Publication Data

US 2002/0078308 A1 Jun. 20, 2002

(51) Int. Cl.[7] .................. G06F 13/28; G06F 13/368
(52) U.S. Cl. .................. 710/22; 710/26; 711/147; 711/153; 711/173; 711/202; 711/203; 711/205; 711/206; 711/207; 711/208
(58) Field of Search .................. 710/22, 26, 27, 710/62, 74; 711/1, 5, 6, 147, 150, 153, 173, 202, 203, 205, 206, 207, 208, 209; 712/1, 14, 20, 27

(56) References Cited

U.S. PATENT DOCUMENTS

| 5,166,674 | A | | 11/1992 | Baum et al. |
| 5,381,537 | A | | 1/1995 | Baum et al. |
| 5,388,217 | A | * | 2/1995 | Benzschawel et al. ........ 710/36 |
| 5,423,013 | A | | 6/1995 | Baum et al. |
| 5,887,134 | A | * | 3/1999 | Ebrahim ..................... 709/200 |
| 5,903,771 | A | * | 5/1999 | Sgro et al. ................... 712/20 |
| 6,119,176 | A | * | 9/2000 | Maruyama .................. 710/25 |
| 6,219,724 | B1 | * | 4/2001 | Kim et al. ................... 710/22 |
| 6,282,588 | B1 | * | 8/2001 | Yamamoto .................. 710/27 |
| 6,526,491 | B2 | * | 2/2003 | Suzoki et al. ............... 711/164 |

* cited by examiner

*Primary Examiner*—B. James Peikari
(74) *Attorney, Agent, or Firm*—Robert A. Voigt, Jr.; Winstead Sechrest & Minick P.C.; Casimer K. Salys

(57) ABSTRACT

A method and system for attached processing units accessing a shared memory in an SMP system. In one embodiment, a system comprises a shared memory. The system further comprises a plurality of processing elements coupled to the shared memory. Each of the plurality of processing elements comprises a processing unit, a direct memory access controller and a plurality of attached processing units. Each direct memory access controller comprises an address translation mechanism thereby enabling each associated attached processing unit to access the shared memory in a restricted manner without an address translation mechanism. Each attached processing unit is configured to issue a request to an associated direct memory access controller to access the shared memory specifying a range of addresses to be accessed as virtual addresses. The associated direct memory access controller is configured to translate the range of virtual addresses into an associated range of physical addresses.

14 Claims, 4 Drawing Sheets

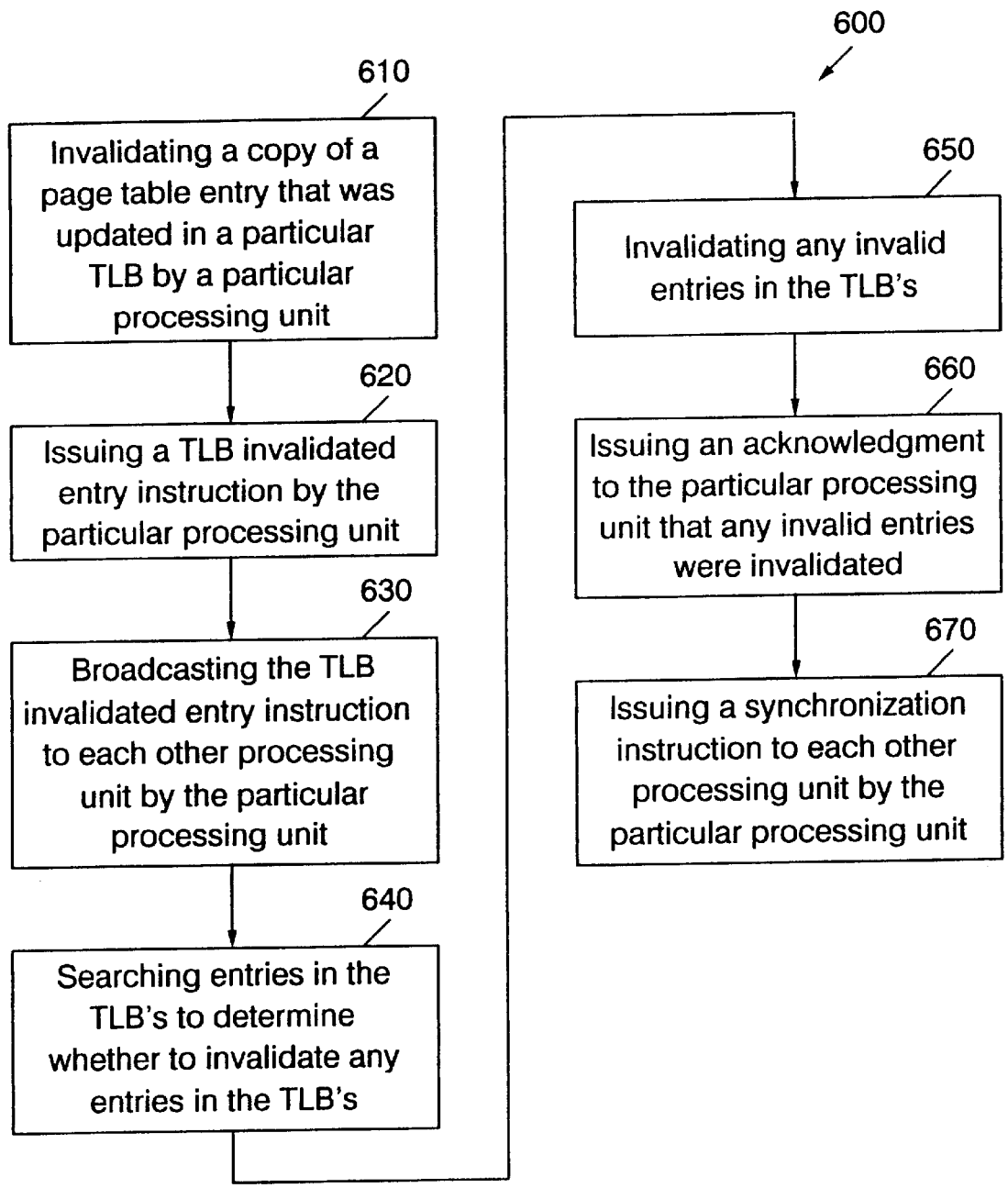

SYMMETRIC MULTI-PROCESSING SYSTEM WITH ATTACHED PROCESSING UNITS BEING ABLE TO ACCESS A SHARED MEMORY WITHOUT BEING STRUCTURALLY CONFIGURED WITH AN ADDRESS TRANSLATION MECHANISM

CROSS REFERENCE TO RELATED APPLICATIONS

The present invention is related to the following U.S. Patent Applications which are incorporated herein by reference:

Ser. No. 09/736,356 entitled "Token Based DMA" filed Dec. 14, 2000.

Ser. No. 09/736,582 entitled "Reduction of Interrupts in Remote Procedure Calls" filed Dec. 14, 2000.

TECHNICAL FIELD

The present invention relates to the field of Symmetric Multi-Processing (SMP) systems, and more particularly to an SMP system where attached processing units have restricted access to a shared memory without being structurally configured with an address translation mechanism.

BACKGROUND INFORMATION

One widely accepted system architecture for personal computers has been the Symmetric Multi-Processing (SMP) architecture. Symmetric Multi-Processing (SMP) computer architectures are known in the art as overcoming the limitations of single or uni-processors in terms of processing speed and transaction throughput, among other things. Typically, commercially available SMP systems are generally "shared memory" systems, characterized in that multiple processing elements on a bus, or a plurality of busses, share a single global memory. In shared memory multiprocessors, all memory is uniformly accessible to each processing element, which simplifies the task of dynamic load distribution. Processing of complex tasks can be distributed among various processing elements in the multiprocessor system while data used in the processing is substantially equally available to each of the processing elements undertaking any portion of the complex task. Similarly, programmers writing code for typical shared memory SMP systems do not need to be concerned with issues of data partitioning, as each of the processing elements has access to and shares the same, consistent global memory.

SMP systems typically run multiple processes or threads at a time where each process requires some amount of physical memory, i.e., a block of physical memory, in the shared memory. Since the amount of physical memory in the shared memory is limited, it must be allocated among the different processing elements. Typically, physical memory may be divided into pages where the pages are allocated to different processing elements. Physical memory that is so allocated may be referred to as mapped memory.

Each process that may be allocated a block of physical memory may further be provided with a set of translations for translating virtual addresses to assigned physical addresses of the allocated block. Each set of translations may be stored in what is commonly referred to as a page table. Page tables are typically stored in the shared memory.

Page tables are commonly indexed by virtual page numbers and include a Page Table Entry (PTE) for each virtual page address. If a virtual page is stored in the shared memory, then a corresponding PTE may include a physical address of the page. The PTE for a page may be identified by looking at an index that corresponds to the virtual page address.

When a process requests access to a particular virtual memory address, a page table that is associated with the process is searched for the requested virtual memory address. When the virtual address is found, the process may access the desired page using the physical address in the PTE that is associated with the virtual address.

Each processing element in the SMP computer architecture may comprise a processing unit. The processing unit may comprise a central processing unit, e.g., Power PC™, and an address translation mechanism such as a Translation Lookaside Buffer (TLB). A TLB may be used for storing a number of most recently used virtual memory address-to-physical memory address translations, i.e., PTE translations. When a processing unit retrieves a translation from the PTE in the shared memory, it typically stores the translation in an associated TLB. The processing unit may retrieve a translation from the TLB faster than from an associated cache or the shared memory.

Each processing element in the SMP computer architecture may further comprise a plurality of Attached Processing Units (APU's). In prior art SMP architectures, each APU may be structured to perform a particular task, e.g., image compression, image decompression, transformation, clipping, lighting, texturing, depth cueing, transparency processing, set-up, screen space rendering of graphics primitives, by the processing unit. That is, an APU may be configured to perform a particular operation, e.g., floating point calculation, vector calculation. For example, an APU may be a floating point unit configured to execute floating point operations on source operands. One of the advantages of an APU structurally configured to perform a particular operation is that the APU's do not have to perform address translation, i.e., mapping virtual addresses to physical addresses. By not performing address translation, APU's do not have to be structurally configured with an address translation mechanism, e.g., TLB, and thereby reduce the complexity of the APU's.

Unfortunately, APU's in prior art SMP computer architectures may not access the shared memory because APU's are not structurally configured with an address translation mechanism, e.g., TLB.

It would therefore be desirable to develop an SMP computer architecture where the APU's have restricted access to the shared memory without being structurally configured with an address translation mechanism. It would further be desirable to develop an SMP computer architecture where the APU's have more capabilities than prior art APU's, i.e., structured to perform a particular task. It would further be desirable to develop an SMP system where Translation Lookaside Buffer (TLB) consistency may be maintained by the processing units only.

SUMMARY

The problems outlined above may at least in part be solved in some embodiments by an SMP system comprising direct memory access controllers with an address translation mechanism, e.g., Translation Lookaside Buffer (TLB). Attached processing units may then be configured to issue a request to access the shared memory to its associated direct memory access controller. Since the direct memory access controllers comprise an address translation mechanism, attached processing units may request to access the shared memory specifying the range of addresses to be accessed as virtual addresses instead of physical addresses thereby foregoing the need of an address translation mechanism.

In one embodiment, a system comprises a shared memory. The system further comprises a plurality of processing elements coupled to the shared memory. Each of the plurality of processing elements comprises a processing unit, a direct memory access controller and a plurality of attached processing units. Each processing unit comprises an address translation mechanism. Each direct memory access controller comprises an address translation mechanism thereby enabling each of the plurality of attached processing units to access the shared memory in a restricted manner without an address translation mechanism. Each of the plurality of attached processing units is configured to issue a request to an associated direct memory access controller to access the shared memory where the request specifies a range of addresses to be accessed as virtual addresses. The associated direct memory access controller is configured to translate the range of virtual addresses to be accessed into an associated range of physical addresses.

In another embodiment of the present invention, a method for maintaining TLB consistency in a system comprising a shared memory and a plurality of processing elements coupled to the shared memory where each of the plurality of processing elements comprises a processing unit, a direct memory access controller and a plurality of attached processing units. Each of the plurality of processing units and plurality of direct memory access controllers comprises a TLB. The method comprises the step of invalidating a copy of a page table entry that was updated in a particular TLB by a particular processing unit. The method further comprises issuing a TLB invalidated entry instruction by the particular processing unit. The TLB invalidated entry may be broadcasted to each of the plurality of processing units other than the particular processing unit by the particular processing unit. The method further comprises determining whether to invalidate any entries in the TLB's associated with each of the plurality of processing units other than the particular processing unit and in the TLB's associated with each of the plurality of direct memory access controllers other than the direct memory access controller associated with the particular processing unit. The method further comprises issuing a synchronization instruction to each of the plurality of processing units other than the particular processing unit by the particular processing unit.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 6 is a flowchart of a method for maintaining TLB consistency.

DETAILED DESCRIPTION

The present invention comprises a system and method for attached processing units accessing a shared memory in an SMP system. In one embodiment of the present invention, a system comprises a shared memory. The system further comprises a plurality of processing elements coupled to the shared memory. Each of the plurality of processing elements comprises a processing unit, a direct memory access controller and a plurality of attached processing units. Each direct memory access controller comprises an address translation mechanism thereby enabling each associated attached processing unit to access the shared memory in a restricted manner without an address translation mechanism. Each attached processing unit is configured to issue a request to an associated direct memory access controller to access the shared memory where the request specifies a range of addresses to be accessed as virtual addresses. The associated direct memory access controller is configured to translate the range of virtual addresses to be accessed into an associated range of physical addresses. In another embodiment of the present invention, a method for maintaining TLB consistency in an SMP system, where each of the plurality of processing units and plurality of direct memory access controllers comprises a TLB, comprises the step of invalidating a copy of a page table entry that was updated in a particular TLB by a particular processing unit. The method further comprises issuing a TLB invalidated entry instruction by the particular processing unit. The TLB invalidated entry may be broadcasted to each of the plurality of processing units other than the particular processing unit by the particular processing unit. The method further comprises determining whether to invalidate any entries in the TLB's associated with each of the plurality of processing units other than the particular processing unit and in the TLB's associated with each of the plurality of direct memory access controllers other than the direct memory access controller associated with the particular processing unit. The method further comprises issuing a synchronization instruction to each of the plurality of processing units other than the particular processing unit by the particular processing unit.

Figure 1:
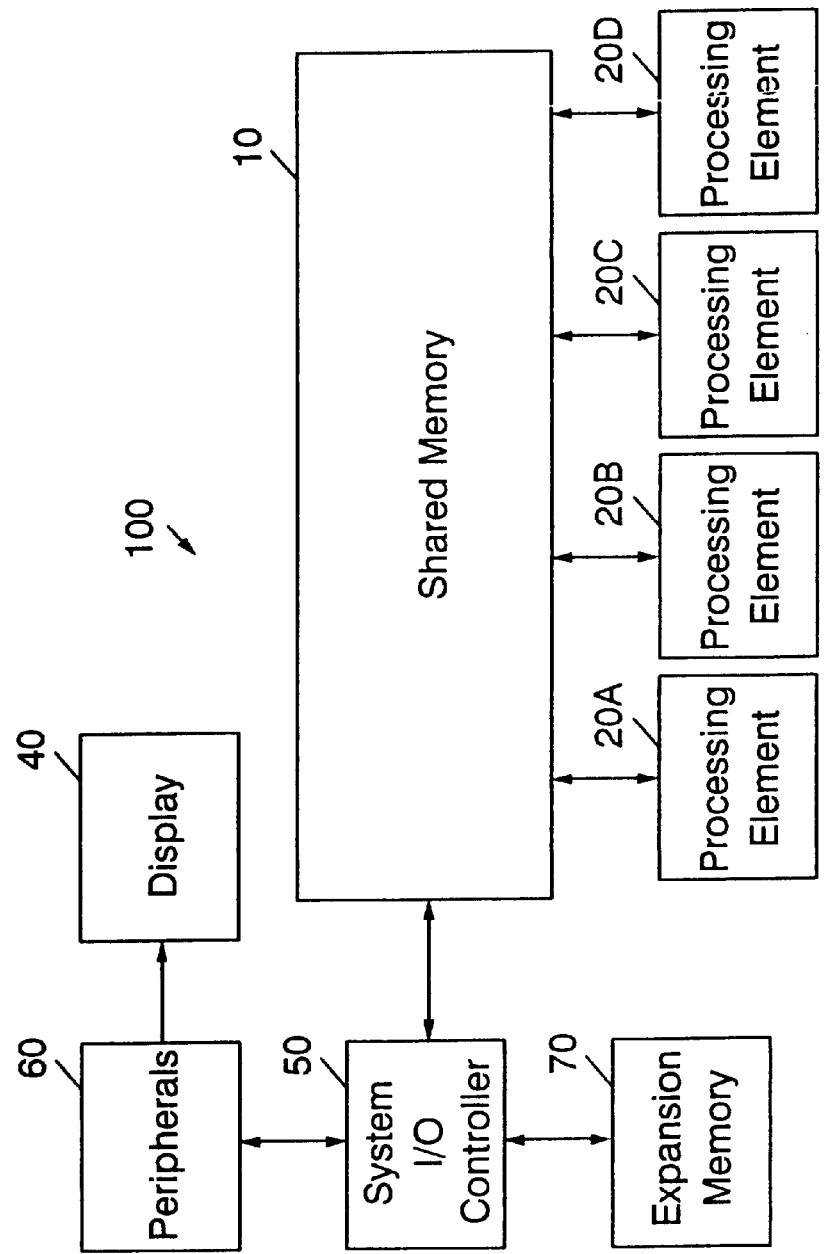
FIG. 1 illustrates a symmetric multi-processing system configured in accordance with the present invention.

FIG. 1—Symmetric Multi-Processing System

FIG. 1 illustrates an embodiment of the present invention of a Symmetric Multi-Processing (SMP) system 100. Symmetric Multi-Processing system 100 comprises a shared memory 10, e.g., Dynamic Random Access Memory (DRAM), Static RAM (SRAM), coupled to a plurality of processing elements 20A–D. Processing elements 20A–D may collectively or individually be referred to as processing elements 20 or processing element 20, respectively. A more detailed description of processing elements 20 are provided below. Shared memory 10 is further coupled to a system Input/Output (I/O) controller 50. System I/O Controller 50 is coupled to one or more peripheral devices 60, e.g., SCSI host bus adapter, LAN adapter, graphics adapter, audio peripheral device, which may be coupled to a display 40. System I/O Controller 50 may further be coupled to expansion memory 70. Expansion memory 70 may be configured to provide a fast file system. It is noted that system 100 may comprise any number of processing elements 20 and peripheral devices 60 and that FIG. 1 is used for illustrative purposes only.

Figure 2:
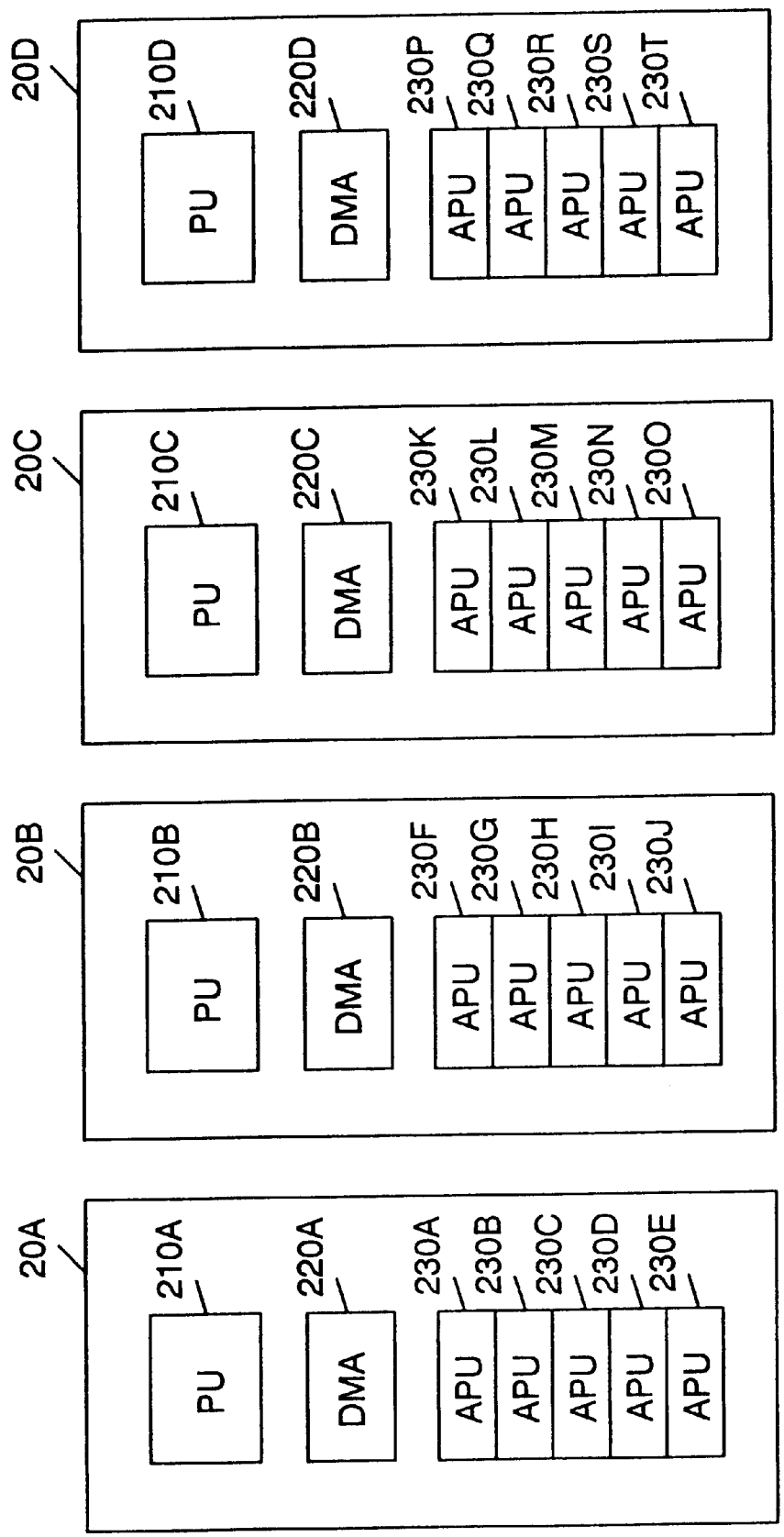
FIG. 2 illustrates an embodiment of processing elements in a symmetric multi-processing system configured in accordance with the present invention.

FIG. 2—Processing Elements

FIG. 2 illustrates an embodiment of the present invention of processing elements 20A–D. Processing element 20A comprises a processing unit 210A, a Direct Memory Address (DMA) controller 220B and a plurality of Attached Processing Units (APU's) 230 A–E. Processing element 20B comprises a processing unit 210B, a DMA controller 220B, and a plurality of APU's 230F–J. Processing element 20C comprises a processing unit 210C, a DMA controller 220C, and a plurality of APU's 230K–O. Processing element 20D comprises a processing unit 210D, a DMA controller 220D, and a plurality of APU's 230P–T. Processing units 210A–D may collectively or individually be referred to as Processing Units (PU's) 210 or Processing Unit (PU) 210, respectively. DMA controllers 220A–D may collectively or individually be referred to as DMA controllers 220 or DMA controller 220, respectively. APU's 230A–T may collectively or individually be referred to as APU's 230 or APU 230, respectively. It is noted that processing elements 20 may comprise any number of APU's 230.

Figure 3:
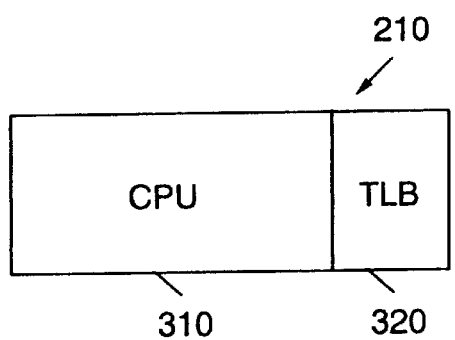
FIG. 3 illustrates an embodiment of a processing unit in a symmetric multi-processing system configured in accordance with the present invention.

FIG. 3—Processing Unit

FIG. 3 illustrates an embodiment of the present invention of a processing unit 210 comprising a central processing unit (CPU) 310 and a Translation Lookaside Buffer (TLB) 320. As stated in the Background Information section, a TLB may be used for storing a number of most recently used virtual memory address-to-physical memory address translations, i.e., PTE translations. CPU 310 may be configured to quickly search and retrieve address translations form TLB 320. It is noted that each processing unit 210 of processing elements 20 may comprise a TLB 320. Since SMP system 100 may comprise a plurality of processing units 210, SMP system 100 may comprise a plurality of TLB's 320.

Processing unit 210, e.g., processing unit 210A, may request to read from or write to shared memory 10 by initiating a Direct Memory Access (DMA) transfer to have the associated DMA controller 220, e.g., DMA controller 220A, issue a DMA request to shared memory 10. That is, blocks of information may be exchanged between a processing unit 210, e.g., processing unit 210A, and shared memory 10 by issuing DMA requests, i.e., requests to read from or write to shared memory 10, to the associated DMA controller 220, e.g., DMA controller 220A. It is also noted that processing unit 210, e.g., processing unit 210A, may request blocks of information to be exchanged between an associated APU 230, e.g., APU 230A, and shared memory 10 by issuing DMA requests to the associated DMA controller 220, e.g., DMA controller 220A. A method for processing units 210 acquiring the right to access shared memory 10 is described in U.S. patent application Ser. No. 09/736,356, filed on Dec. 14, 2000, entitled "Token Based DMA," which is hereby incorporated in its entirety by reference.

Prior to processing unit 210, e.g., processing unit 210A, issuing a DMA request to access shared memory 10 to the associated DMA controller 220, e.g., DMA controller 220A, processing unit 210, e.g., processing unit 210A, may translate the range of virtual addresses to be accessed. That is, processing unit 210, e.g., processing unit 210A, may translate the range of virtual addresses to be read from or written to in shared memory to physical addresses. In one embodiment, CPU 310 of processing unit 210, e.g., processing unit 210A, may be configured to first search through the associated TLB 320 for the translation, i.e., virtual memory address-to-physical memory address translation, prior to issuing a DMA request to the associated DMA controller 220, e.g., DMA controller 220A. If the translation exists in the associated TLB 320, processing unit 210, e.g., processing unit 210A, retrieves the physical address from TLB 320. When processing unit 210, e.g., processing unit 210A, issues a DMA request to access shared memory 10 to the associated DMA controller 220, e.g., DMA controller 220A, processing unit 210, e.g., processing unit 210A, specifies the range of physical addresses to be accessed.

If the translation does not exist in the associated TLB 320, then processing unit 210, e.g., processing unit 210A, searches through a page table (not shown) in shared memory 10. As stated in the Background Information section, page tables may be indexed by virtual page numbers and include a Page Table Entry (PTE) for each virtual page address. The PTE may include a physical address associated with a particular virtual address. Processing unit 210, e.g., processing unit 210A, may then identify the PTE, i.e., physical memory address associated with the virtual memory address, by identifying the corresponding PTE through an index that corresponds to the virtual address. Upon translating the range of virtual addresses to be accessed, processing unit 210, e.g., processing unit 210A, issues a DMA request to access shared memory 10 to the associated DMA controller 220, e.g., DMA controller 220A, specifying the range of physical addresses to be accessed.

In one embodiment, the physical addresses to be accessed, e.g., a page in shared memory 10, are "pinned" such as by the operating system. Physical addresses that are pinned may not be reassigned such as for a page fault. That is, the virtual address-to-physical address mapping for the physical addresses to be accessed, e.g., a page in shared memory 10, remains constant as long the physical addresses to be accessed, e.g., a page in shared memory 10, are pinned. A pinned page has effectively been removed from the virtual and physical memory spaces of all processes other than the process that pinned it.

Figure 4:
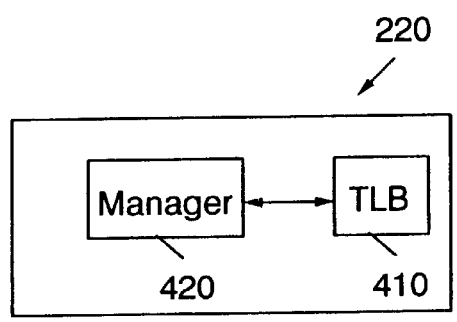
FIG. 4 illustrates an embodiment of a direct memory access controller in a symmetric multi-processing system configured in accordance with the present invention.

FIG. 4—Direct Memory Access Controller

FIG. 4 illustrates an embodiment of the present invention of a direct memory access controller 220. Direct memory access controller 220 may comprise a manager 420 and a TLB 410 Manager 420 may be configured to search through TLB 410 for address translations, i.e., virtual memory address-to-physical memory address translations. As stated in the Background Information section, a TLB may be used for storing a number of most recently used virtual memory address-to-physical memory address translations, i.e., PTE translations It is noted that each direct memory access controller 220 of processing elements 20 may comprise a TLB 410. Since SMP system 100 may comprise a plurality of DMA controllers 220, SMP system 100 may comprise a plurality of TLB's 410.

As stated in the Background Information section, in prior art SMP computer architectures attached processing units (APU's) may not access the shared memory because the APU's were not structurally configured with an address translation mechanism, e.g., TLB. FIG. 4 illustrates a direct memory access controller 220, e.g., DMA controller 220A, comprising a TLB 410 that allows the associated APU's 230, e.g., APU 230A–E, to access shared memory 10 without an address translation mechanism, e.g., TLB.

APU's 230 may be configured to request to read from or write to shared memory 10 by initiating a Direct Memory Access (DMA) transfer to have the associated DMA controller 220, e.g., DMA controller 220A, issue a DMA request to shared memory 10. That is, blocks of information may be exchanged between an APU 230, e.g., APU 230A, and shared memory 10 by issuing DMA requests, i.e., requests to read from or write to shared memory 10, to the associated DMA controller 220, e.g., DMA controller 220A. In the DMA request to shared memory 10, APU 230, e.g., APU 230A, does not translate the range of virtual addresses to be accessed. When APU 230, e.g., APU 230A, issues a DMA request to access shared memory 10 to the associated DMA controller 220, e.g., DMA controller 220A, APU 230, e.g., APU 230A, specifies the range of addresses to be accessed as virtual addresses and not as physical addresses. Therefore, APU 230, e.g., APU 230A, does not require an address translation mechanism, e.g., TLB.

The DMA controller 220, e.g., DMA controller 220A, upon receiving the DMA request from the associated APU 230, e.g., APU 230A, translates the range of virtual addresses to be accessed by the associated APU 230, e.g., APU 230A. That is, DMA controller 220, e.g., DMA controller 210A, may translate the range of virtual addresses to be read from or written to in shared memory 10 by the associated APU 230, e.g., APU 230A, to physical addresses. In one embodiment, manager 420 of DMA controller 220, e.g., DMA controller 220A, maybe configured to search through the associated TLB 410 for the translation, i.e., virtual memory address-to-physical memory address translation, of the virtual addresses to be accessed in shared memory 10. In one embodiment, if the translation exists in the associated TLB 410, manager 420 of DMA controller 220, e.g., DMA controller 220A, may retrieve the physical address from TLB 410. DMA controller 220, e.g., DMA controller 220A, subsequently specifies the range of physical addresses to be accessed by the associated APU 230, e.g., APU 230A, to shared memory 10.

If the translation does not exist in the associated TLB 410, then manager 420 of DMA controller 220, e.g., DMA controller 220A, searches through a page table (not shown) in shared memory 10. As stated in the Background Information section, page tables may be indexed by virtual page numbers and include a Page Table Entry (PTE) for each virtual page address. The PTE may include a physical address associated with a particular virtual address. Manager 420 of DMA controller 220, e.g., DMA controller 220A, may then identify the PTE, i.e., physical memory address associated with the virtual memory address, by identifying the corresponding PTE through an index that corresponds to the virtual address. Upon translating the range of virtual addresses to be accessed, DMA controller 220, e.g., DMA controller 220A, specifies the range of physical addresses to be accessed by the associated APU 230, e.g., APU 230A, to shared memory 10.

In one embodiment, the physical addresses to be accessed, e.g., a page in shared memory 10, are "pinned" such as by the operating system. Physical addresses that are pinned may not be reassigned such as for a page fault. That is, the virtual address-to-physical address mapping for the physical addresses to be accessed, e.g., a page in shared memory 10, remains constant as long the physical addresses to be accessed, e.g., a page in shared memory 10, are pinned. A pinned page has effectively been removed from the virtual and physical memory spaces of all processes other than the process that pinned it.

Figure 5:
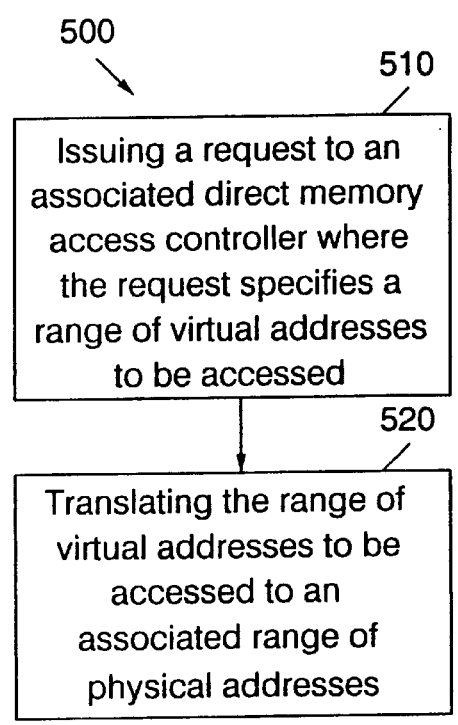
FIG. 5 is a flowchart of a method for attached processing units to access the shared memory without an address translation mechanism.

FIG. 5—Method for Attached Processing Units Accessing a Shared Memory

FIG. 5 illustrates a flowchart of one embodiment of the present invention of a method 500 for attached processing units 230 accessing shared memory 10. As stated in the Background Information section, in prior art SMP computer architectures attached processing units (APU's) may not access the shared memory because the APU's were not structurally configured with an address translation mechanism, e.g., TLB. FIG. 5 illustrates a method 500 for APU's 230 to access shared memory 10 without an address translation mechanism, e.g., TLB.

In step 510, APU's 230 may be configured to issue a request, i.e., DMA request, to read from or write to shared memory 10 to the associated DMA controller 220, e.g., DMA controller 220A. In the DMA request, APU 230, e.g., APU 230A, does not translate the range of virtual addresses to be accessed. That is, when APU 230, e.g., APU 230A, issues a DMA request to access shared memory 10 to the associated DMA controller 220, e.g., DMA controller 220A, APU 230, e.g., APU 230A, specifies the range of addresses to be accessed as virtual addresses and not as physical addresses. Subsequently, APU 230, e.g., APU 230A, does not require an address translation mechanism, e.g., TLB.

In step 520, the DMA controller 220, e.g., DMA controller 220A, upon receiving the DMA request from the associated APU 230, e.g., APU 230A, translates the range of virtual addresses to be accessed by the associated APU 230, e.g., APU 230A. That is, DMA controller 220, e.g., DMA controller 210A, may translate the range of virtual addresses to be read from or written to in shared memory 10 by the associated APU 230, e.g., APU 230A, to physical addresses. In one embodiment, manager 420 of DMA controller 220, e.g., DMA controller 220A, may be configured to search through the associated TLB 410 for the translation, i.e., virtual memory address-to-physical memory address translation, of the virtual addresses to be accessed in shared memory 10. In one embodiment, if the translation exists in the associated TLB 410, manager 420 of DMA controller 220, e.g., DMA controller 220A, may retrieve the physical address from TLB 410. DMA controller 220, e.g., DMA controller 220A, subsequently specifies the range of physical addresses to be accessed by the associated APU 230, e.g., APU 230A, to shared memory 10.

If the translation does not exist in the associated TLB 410, then manager 420 of DMA controller 220, e.g., DMA controller 220A, searches through a page table (not shown) in shared memory 10. As stated in the Background Information section, page tables may be indexed by virtual page numbers and include a Page Table Entry (PTE) for each virtual page address. The PTE may include a physical address associated with a particular virtual address. Manager 420 of DMA controller 220, e.g., DMA controller 220A, may then identify the PTE, i.e., physical memory address associated with the virtual memory address, by identifying the corresponding PTE through an index that corresponds to the virtual address. Upon translating the range of virtual addresses to be accessed, DMA controller 220, e.g., DMA controller 220A, specifies the range of physical addresses to be accessed by the associated APU 230, e.g., APU 230A, to shared memory 10.

In one embodiment, the physical addresses to be accessed, e.g., a page in shared memory 10, are "pinned" such as by the operating system. Physical addresses that are pinned may not be reassigned such as for a page fault. That is, the virtual address-to-physical address mapping for the physical addresses to be accessed, e.g., a page in shared memory 10, remains constant as long the physical addresses to be accessed, e.g., a page in shared memory 10, are pinned. A pinned page has effectively been removed from the virtual and physical memory spaces of all processes other than the process that pinned it.

FIG. 6—Method for Maintaining TLB Consistency

FIG. 6 illustrates a flowchart of one embodiment of the present invention of a method 600 for maintaining TLB consistency by processing units 210 where the physical addresses to be accessed, e.g., a page in shared memory 10, are not "pinned". A problem that confronts TLB's, e.g., TLB 320, TLB 410, is maintaining consistency of data that is stored in more than one location. For example, a PTE may be retrieved from shared memory 10 and stored in one or more TLB's 320 of processing units 210 and/or in one or more TLB's 410 of DMA controllers 220. Later, an operating system may change or invalidate the PTE. For example, data that is stored in the mapped physical memory location may be moved to another physical location. As a result of the movement of data, the PTE is no longer valid because it stores the physical address of the data prior to the movement. Thus, the operating system updates the PTE to reflect the new physical location of the data in the page table. The copy of the PTE that is stored in one or more TLB's 320 of processing units 210 and/or in one or more TLB's 410 of DMA controllers 220 is no longer valid. Subsequently, the TLB entries associated with the data moved must be invalidated. The invalidation of a PTE cached in an entry of a TLB, e.g., TLB 320, TLB 410, is complicated by the fact that each processing unit 210 and each DMA controller 220 has its own TLB. Method 600 is a method for maintaining TLB consistency of all TLB's, e.g., TLB's 320 of processing units 210, TLB's 410 of DMA controllers 220, by processing units 210.

In step 610, the CPU 310 of processing unit 210, e.g., processing unit 210A, invalidates the copy of the PTE, i.e., the PTE that was updated, that was cached in the entry of its TLB 320 and/or in the entry of the TLB 410 of its associated DMA controller 220, e.g., DMA controller 220A.

In step 620, the processing unit 210, e.g., processing unit 210A, that invalidated the copy of the PTE, i.e., the PTE that was updated, in step 610, issues a TLB invalidated entry instruction for each virtual address for which the entry should be invalidated in all the TLB's, e.g., TLB 320, TLB 410, that comprises the entry for the invalidated mapping.

In step 630, the TLB invalidated entry instruction may be broadcast from processing unit 210, e.g., processing unit 210A, that issued the TLB invalidated entry instruction instep 620, to each other processing unit 210, e.g., processing units 210B–D, in SMP system 100.

In step 640, CPU's 310 of the processing units 210, e.g., processing units 210B–D, other than the issuing processing unit 210, e.g., processing unit 210A, search through the entries of its associated TLB's 320 as well as the entries of the TLB's 410 of its associated DMA controllers 220, e.g., DMA controllers 220B–D, to determine if any of its entries are invalid, i.e., determine if any of its entries match the entry invalidated by the issuing processing unit 210, e.g., processing unit 210A. In another embodiment, CPU 310 of each of the other processing units 210, e.g., processing units 210B–D, may search through the entries of its associated TLB's 320 to determine if any of its entries are invalid, i.e., determine if any of its entries match the entry invalidated by the issuing processing unit 210, e.g., processing unit 210A. Manager 420 in each of the DMA controllers 220, e.g., DMA controllers 220B–D, associated with the processing units 210, e.g., processing units 210B–D, other than the issuing processing unit 210, e.g., processing unit 210A, may be configured to search through the entries of its associated TLB 410 to determine if any of its entries are invalid, i.e., determine if any of its entries match the entry invalidated by the issuing processing unit 210, e.g., processing unit 210A.

In step 650, CPU 310 of each of the processing units 210, e.g., processing units 210B–D, other than the issuing processing unit 210, e.g., processing unit 210A, may be configured to invalidate any invalid entries in its associated TLB 320 as well as the entries of the TLB 410 of its associated DMA controller 220, e.g., DMA controller 220B. In another embodiment, CPU 310 of each of the processing units 210, e.g., processing units 210B–D, other than the issuing processing unit 210, e.g., processing unit 210A, may be configured to invalidate any invalid entries in its associated TLB 320. Manager 420 in each of the DMA controllers 220, e.g., DMA controllers 220B–D, associated with the processing units 210, e.g., processing units 210B–D, other than the issuing processing unit 210, e.g., processing unit 210A, may be configured to invalidate any invalid entries in the TLB 410 of its associated DMA controller 220, e.g., DMA controller 220B.

In step 660, CPU 310 of each of the processing units 210, e.g., processing units 210B–D, other than the issuing processing unit 210, e.g., processing unit 210A, may be configured to issue an acknowledgment to the respective issuing processing unit 210, e.g., processing unit 210A, that CPU 310 invalidated any invalid entries in its associated TLB 320 as well as the entries of the TLB 410 of its associated DMA controller 220, e.g., DMA controller 220B. In another embodiment, CPU 310 of each of the processing units 210, e.g., processing units 210B–D, other than the issuing processing unit 210, e.g., processing unit 210A, may be configured to issue an acknowledgment to the respective issuing processing unit 210, e.g., processing unit 210A, that CPU 310 invalidated any invalid entries in its associated TLB 320. Manager 420 in each of the DMA controllers 220, e.g., DMA controllers 220B–D, associated with the processing units 210, e.g., processing units 210B–D, other than the issuing processing unit 210, e.g., processing unit 210A, may be configured to issue an acknowledgment to the respective issuing processing unit 210, e.g., processing unit 210A, that manager 420 invalidated any invalid entries in its associated TLB 410.

In step 670, the TLB invalidated entry instruction or instructions if multiple TLB entries are invalidated may be followed in the instruction sequence of the issuing processing unit 210, e.g., processing unit 210A, by one or more synchronization instructions to each of the other processing units 210, e.g., processing units 210B–D. The one or more synchronization instructions may guarantee that the TLB entry invalidation has been performed by all the other processing units 210, e.g., processing units 210B–D.

It is noted for clarity that the steps 610–670 of method 600 may be executed in any order and that the order presented in the discussion of FIG. 6 is used for illustrative purposes only. It is further noted that the page table (not shown) in shared memory 10 may be locked prior to the execution of method 600 and unlocked after the execution of method 600 by the operating system.

Although the system and method of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A system comprising:

a shared memory; and a plurality of processing elements coupled to said shared memory, wherein at least one of said plurality of processing elements comprises a processing unit, a direct memory access controller and a plurality of attached processing units, wherein said direct memory access controller comprises an address translation mechanism, wherein said plurality of attached processing units are configured to access said shared memory using said direct memory access controller.

2. The system as recited in claim 1, wherein said plurality of attached processing units is configured to issue a request to an associated direct memory access controller to access said shared memory, wherein said request specifies a range of addresses to be accessed as virtual addresses.

3. The system as recited in claim 2, wherein said associated direct memory access controller is configured to translate said range of virtual addresses to be accessed.

4. The system as recited in claim 3, wherein said associated direct memory access controller translates said range of virtual addresses to be accessed by retrieving an associated range of physical addresses from said address translation mechanism.

5. The system as recited in claim 4, wherein said associated direct memory access controller comprises a manager, wherein said manager is configured to search said address translation mechanism for said associated range of physical addresses.

6. The system as recited in claim 3, wherein said associated direct memory access controller translates said range of virtual addresses to be accessed by retrieving an associated range of physical addresses from a page table in said shared memory.

7. The system as recited in claim 6, wherein said associated direct memory access controller comprises a manager, wherein said manager is configured to search said page table in said shared memory for said associated range of physical addresses.

8. The system as recited in claim 3, wherein said range of virtual addresses to be accessed are translated into an associated range of physical addresses, wherein said associated range of physical addresses are pinned.

9. The system as recited in claim 1, wherein said address translation mechanism comprises a translation lookaside buffer.

10. A method for attached processing units accessing a shared memory in a system comprising the steps of:
    issuing a request to an associated direct memory access controller to access said shared memory, by an attached processing unit element that does not contain an address translation mechanism, wherein said request specifies a range of addresses to be accessed as virtual addresses; and
    translating said range of virtual addresses to be accessed to an associated range of physical addresses by said associated direct memory access controller.

11. The method as recited in claim 10, wherein said associated direct memory access controller translates said range of virtual addresses to be accessed by retrieving said associated range of physical addresses from an address translation mechanism.

12. The method as recited in claim 11, wherein said address translation mechanism is a translation lookaside buffer.

13. The method as recited in claim 10, wherein said associated direct memory access controller translates said range of virtual addresses to be accessed by retrieving said associated range of physical addresses from a page table in said shared memory.

14. The method as recited in claim 10, wherein said associated range of physical addresses are pinned.

* * * * *

UNITED STATES PATENT AND TRADEMARK OFFICE
CERTIFICATE OF CORRECTION

PATENT NO. : 6,779,049 B2
DATED : August 17, 2004
INVENTOR(S) : Erik R. Altman et al.

It is certified that error appears in the above-identified patent and that said Letters Patent is hereby corrected as shown below:

Column 11,
Line 8, please replace "is" with -- are --.

Column 12,
Line 11, please delete ",".

Signed and Sealed this

Third Day of May, 2005

JON W. DUDAS
*Director of the United States Patent and Trademark Office*